US011320278B2

(12) United States Patent
Huang et al.

(10) Patent No.: US 11,320,278 B2
(45) Date of Patent: May 3, 2022

(54) TIME-BASED MULTIPLE AUTOMOBILE TRAVEL COORDINATION

(71) Applicant: INTERNATIONAL BUSINESS MACHINES CORPORATION, Armonk, NY (US)

(72) Inventors: Lei Huang, Mountain View, CA (US); Hovey Raymond Strong, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 250 days.

(21) Appl. No.: 16/534,031

(22) Filed: Aug. 7, 2019

(65) Prior Publication Data
US 2021/0041252 A1    Feb. 11, 2021

(51) Int. Cl.
*G01C 21/00* (2006.01)
*G01C 21/34* (2006.01)
*G01C 21/36* (2006.01)

(52) U.S. Cl.
CPC ..... *G01C 21/3438* (2013.01); *G01C 21/3492* (2013.01); *G01C 21/3655* (2013.01)

(58) Field of Classification Search
None
See application file for complete search history.

(56) References Cited

U.S. PATENT DOCUMENTS

| 9,562,783 | B2 | 2/2017 | Bourne |
| 9,628,958 | B1 | 4/2017 | Mcburney |
| 9,651,391 | B1 | 5/2017 | Hayes et al. |
| 9,702,714 | B2 * | 7/2017 | Botea ................ G01C 21/3691 |

(Continued)

FOREIGN PATENT DOCUMENTS

| CN | 104933201 A | 9/2015 |
| CN | 107615733 A | 1/2018 |

(Continued)

OTHER PUBLICATIONS

Mell, Peter et al. "The NIST Definition of Cloud Computing" Recommendations of the National Institute of Standards and Technology, National Institute of Standards and Technology (NIST); Special Publication 800-145; 7 pgs.

*Primary Examiner* — James M McPherson
(74) *Attorney, Agent, or Firm* — Cantor Colburn LLP (57) ABSTRACT

A computer-implemented method for time-based multiple automobile travel coordination. Aspects include creating a travel coordination group having at least two participants and obtaining a current position and a destination location for each of the at least two participants. Aspects also include determining an estimated travel time for each of the at least two participants based at least in part on the current position and the destination location for each of the at least two participants. Aspects further include coordinating travel plans for each of the at least two participants based at least in part on the estimated travel time of each of the at least two participants, wherein the coordination includes determining a departure time for each of the at least two participants such that each of the at least two participants will arrive at the destination location within a threshold amount of time from one another.

13 Claims, 5 Drawing Sheets

(56) References Cited

U.S. PATENT DOCUMENTS

| | | | |
|---|---|---|---|
| 2003/0027558 A1* | 2/2003 | Eisinger | G06Q 10/109 |
| | | | 455/414.1 |
| 2005/0283308 A1* | 12/2005 | Szabo | G01C 21/20 |
| | | | 701/411 |
| 2009/0276154 A1 | 11/2009 | Subramanian et al. | |
| 2013/0332067 A1* | 12/2013 | Schlesinger | G01C 21/3438 |
| | | | 701/422 |
| 2014/0200804 A1 | 7/2014 | Wippler | |
| 2016/0084663 A1 | 3/2016 | Tucker | |
| 2016/0247113 A1* | 8/2016 | Rademaker | G06Q 10/063114 |
| 2017/0122752 A1* | 5/2017 | Feng | G01C 21/34 |
| 2018/0143026 A1* | 5/2018 | Greenberg | G06F 16/9535 |
| 2019/0137290 A1* | 5/2019 | Levy | G01C 21/3461 |
| 2020/0219067 A1* | 7/2020 | Lacaze | G01C 21/3484 |

FOREIGN PATENT DOCUMENTS

| | | | |
|---|---|---|---|
| WO | 2011071965 A2 | 6/2011 | |
| WO | 2016144920 A2 | 9/2016 | |
| WO | 2016165547 A1 | 10/2016 | |

* cited by examiner

TIME-BASED MULTIPLE AUTOMOBILE TRAVEL COORDINATION

BACKGROUND

The present invention generally relates to travel coordination system, and more specifically, to time-based multiple automobile travel coordination.

Often a group of individuals tries to coordinate their travel plans to arrive at a meeting location at a desired time, or within a desired time period from one another. For example, a group of friends may wish to meet up with each other at a restaurant and may want to arrive within ten minutes of each other, so that no one has to wait too long on the others to arrive. Currently, such travel coordination is limited to the members of the group agreeing upon the desired arrival time and each individual taking the necessary steps to arrive at the desired arrival time.

SUMMARY

Embodiments of the present invention are directed to a computer-implemented method for time-based multiple automobile travel coordination A non-limiting example of the computer-implemented method includes creating a travel coordination group having at least two participants and obtaining a current position and a destination location for each of the at least two participants. The method also includes determining an estimated travel time for each of the at least two participants based at least in part on the current position and the destination location for each of the at least two participants. The method further includes coordinating travel plans for each of the at least two participants based at least in part on the estimated travel time of each of the at least two participants, wherein the coordination includes determining a departure time for each of the at least two participants such that each of the at least two participants will arrive at the destination location within a threshold amount of time from one another.

Embodiments of the present invention are directed to a system for time-based multiple automobile travel coordination. A non-limiting example of the system includes a processor in communication with one or more types of memory. The processor is configured to create a travel coordination group having at least two participants and obtain a current position and a destination location for each of the at least two participants. The processor is also configured to determine an estimated travel time for each of the at least two participants based at least in part on the current position and the destination location for each of the at least two participants. The processor is further configured to coordinate travel plans for each of the at least two participants based at least in part on the estimated travel time of each of the at least two participants, wherein the coordination includes determining a departure time for each of the at least two participants such that each of the at least two participants will arrive at the destination location within a threshold amount of time from one another.

Embodiments of the invention are directed to a computer program product for time-based multiple automobile travel coordination the computer program product comprising a computer readable storage medium having program instructions embodied therewith. The program instructions are executable by a processor to cause the processor to perform a method. A non-limiting example of the method includes creating a travel coordination group having at least two participants and obtaining a current position and a destination location for each of the at least two participants. The method also includes determining an estimated travel time for each of the at least two participants based at least in part on the current position and the destination location for each of the at least two participants. The method further includes coordinating travel plans for each of the at least two participants based at least in part on the estimated travel time of each of the at least two participants, wherein the coordination includes determining a departure time for each of the at least two participants such that each of the at least two participants will arrive at the destination location within a threshold amount of time from one another.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
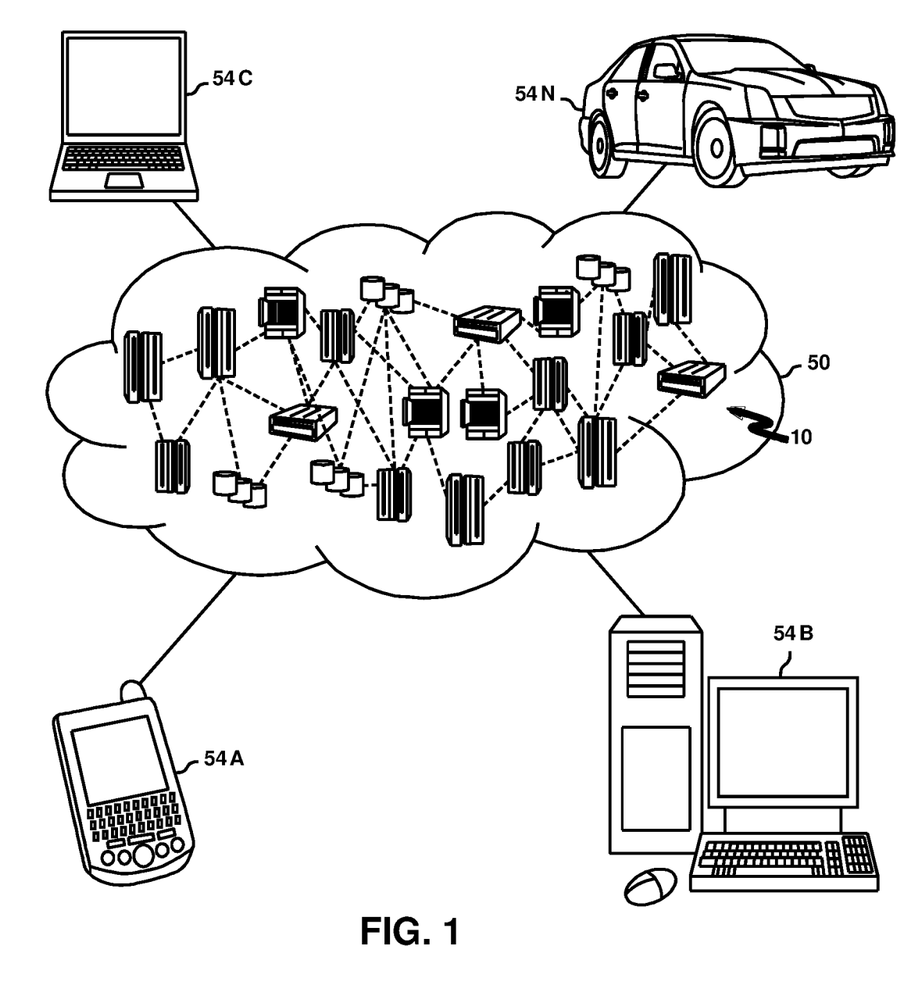
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
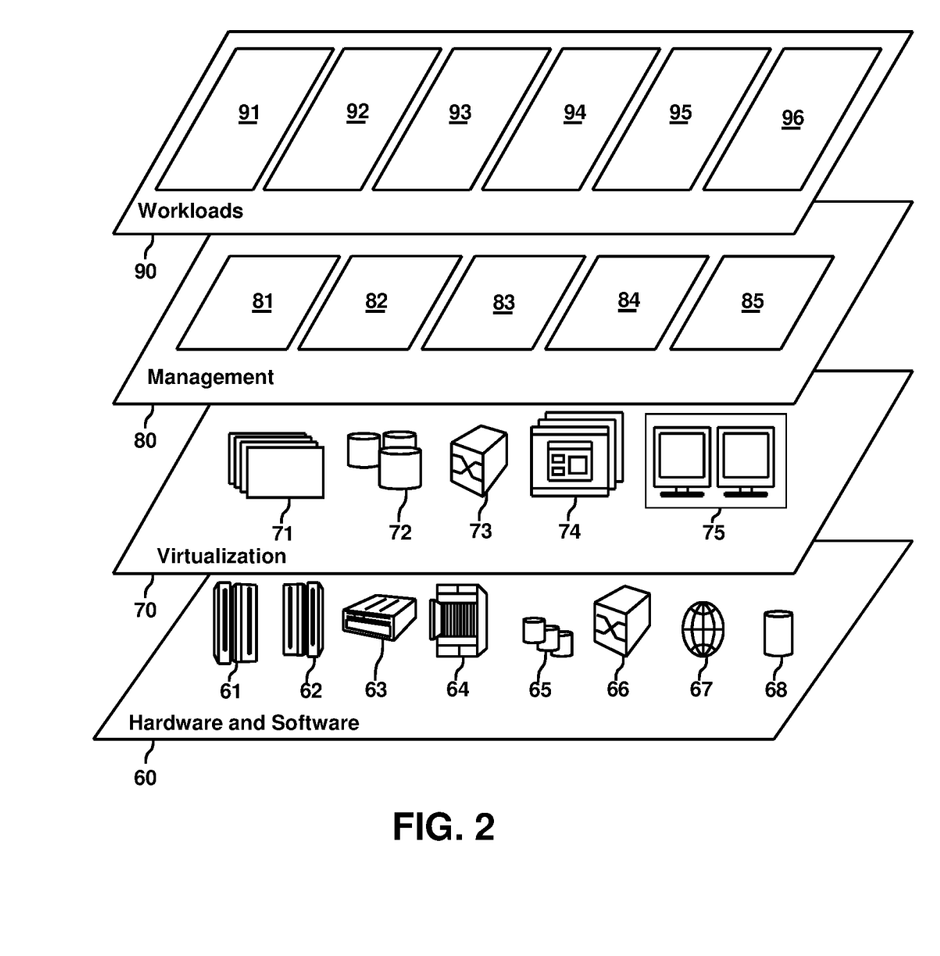
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85, provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; anomalies process 95; and time-based multiple automobile travel coordination 96.

Figure 3:
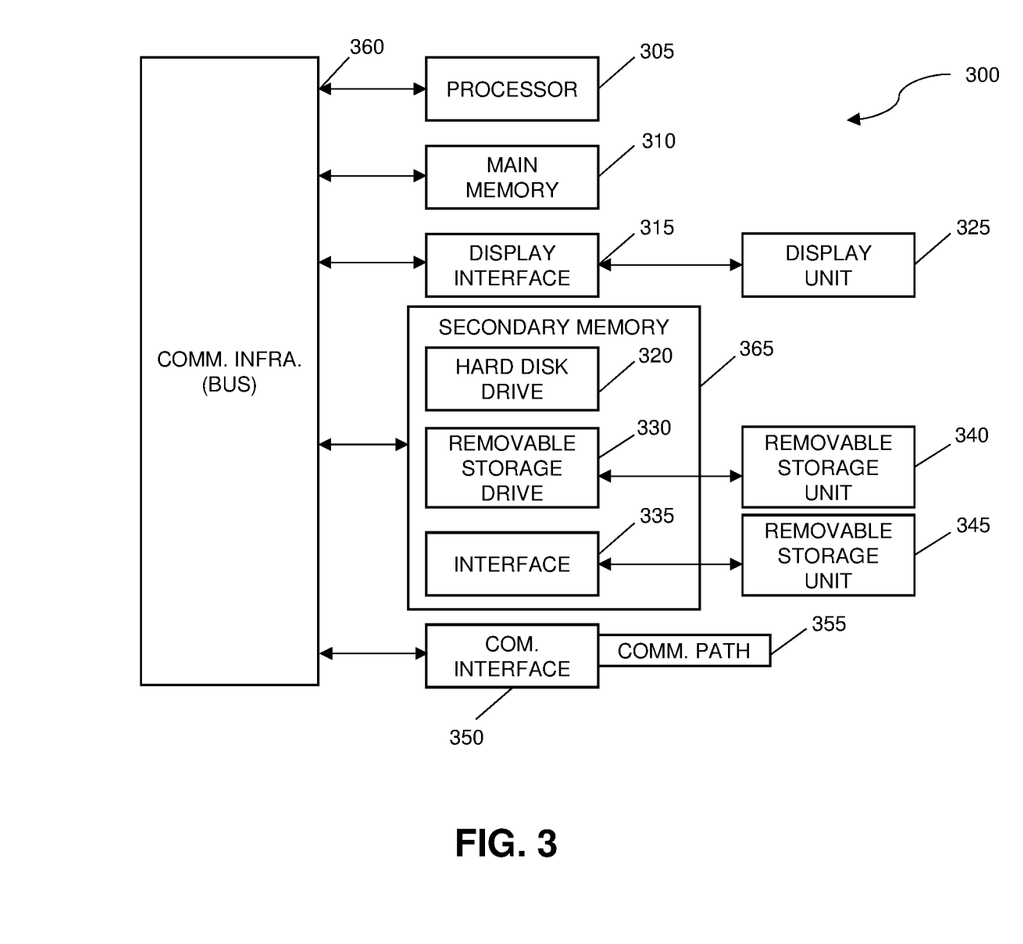
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, methods, systems and computer program products for time-based multiple automobile travel coordination are provided. In exemplary embodiments, a group of individuals form a travel coordination group that includes an initial desired meeting time and a threshold amount of time that each member will arrive at their destination within. In one example, a travel coordination group includes a number of participants that are planning on meeting at a desired location at an initial desired time and a maximum amount of time that any one of the participants will have to wait at the desired location for the other participants to arrive. In exemplary embodiments, the travel coordination system is configured to update the travel plans of the participants of the travel coordination group to minimize the waiting time of the participants for one another. In exemplary embodiments, the travel coordination system prioritizes compliance with the threshold amount of time that each member will arrive at their destination within, i.e., the maximum amount of time that any participant must wait for another participant to arrive, over adhering to the initial desired arrival time.

Figure 4:
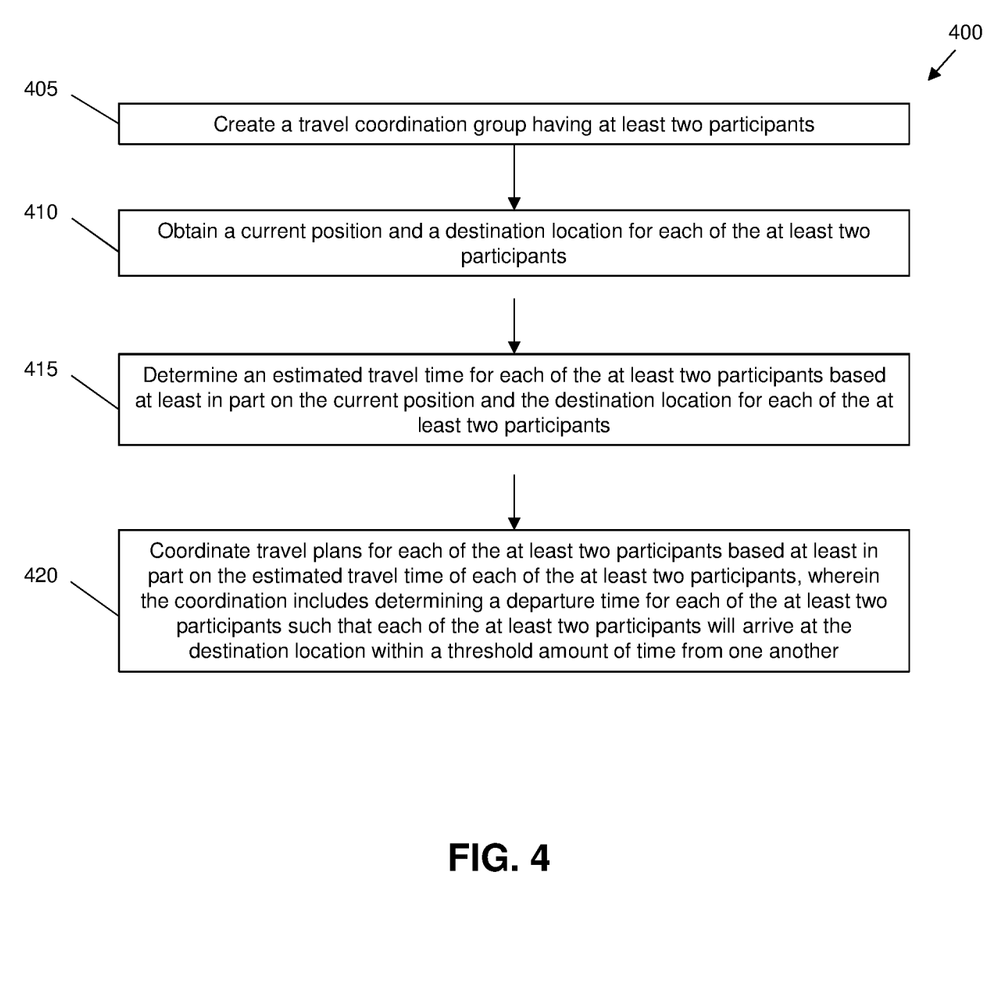
FIG. 4 depicts a flowchart of a method for time-based multiple automobile travel coordination according to an embodiment of the invention.

Referring now to FIG. 4 a flowchart of a method 400 for time-based multiple automobile travel coordination in accordance with an embodiment is shown. As shown at block 405, the method 400 includes creating a travel coordination group having at least two participants. In exemplary embodiments, the travel coordination group is created in response to a request from one of the participants and the request includes an initial desired meeting time. Next, as shown at block 410, the method 400 includes obtaining a current position and a destination location for each participant of the travel coordination group. In exemplary embodiments, the current position of each participant is obtained from an electronic device associated with the participant, such as a smartphone, automobile, or other device. Next, as shown at block 415, the method 400 includes determining an estimated travel time for each of the at least two participants based at least in part on the current position and the destination location for each of the at least two participants. The estimated travel time is determined using one or more known techniques to determine a route between the current position and the destination location and expected travel time along that route. In exemplary embodiments, the estimated travel time for each of the at least two participants is further based on one of a traffic condition or a weather condition on a route between the current position and the destination location.

The method 400 also includes coordinating travel plans for each of the at least two participants based at least in part on the estimated travel time of each of the at least two participants, as shown at block 420. The coordination includes determining a departure time for each of the at least two participants such that each of the at least two participants will arrive at the destination location within a threshold amount of time from one another. In exemplary embodiments, minimizing the difference in the arrival times of the participants at their destination locations is prioritized over the participants arriving at the initial desired time. In exemplary embodiments, different participants may have different priorities regarding the threshold (e.g. participant A can wait maximumly 5 minutes, but participant B can wait up to 20 minutes). In exemplary embodiments, if the system cannot make the coordination for all participants, given someone cannot make the trip anyway, the system can help participants to vote on options including keep the meeting as it is, cancel, and reschedule.

In exemplary embodiments, the destination location of the participants is the same location. For example, each of the participants are meeting at a restaurant or a park. In another embodiment, the destination locations of the participants are different locations. In one example, the participants are attending a virtual meeting with each other and a first participant plans to attend from their office while the second participant plans to attend from their home. In another example, participants A and B plan to have a remote video meeting at 4 pm at their local time. Participants A and B also plan to drive to their individual office (e.g. A's office is in New York, B's office in San Jose) to join the meeting. The system can help to coordinate them to arrive at their office to join the meeting within a threshold amount of time.

In exemplary embodiments, the travel plans of each participant include a departure time, a travel route and one or more stops along the route. In one embodiment, the one or more stops can be associated with a service provider, such as a gas station, restaurant or the like. In exemplary embodiments, the participant set up preferences and selects service providers that the participant likes to frequent, such as a favorite restaurant or preferred brand of gas station. The travel coordination system can send an estimated arrival time of the participant to different service providers and can obtain expected the visiting time (e.g. sum of waiting time, consumption time, etc.) from the service provider based on the estimated arrival time, user preferences or special recommendations. Each of the stops includes an estimated time that will be spent at the stop and the estimated time is determined based on a combination of an estimated waiting time and an estimated service time at the service provider. The estimated waiting time and the estimated service time are obtained based at least in part on data received from the service provider. In one embodiment, the data received from the service provider includes historical service times and waiting times. In another embodiment, the data received from the service provider includes real-time service times and waiting times.

Figure 5:
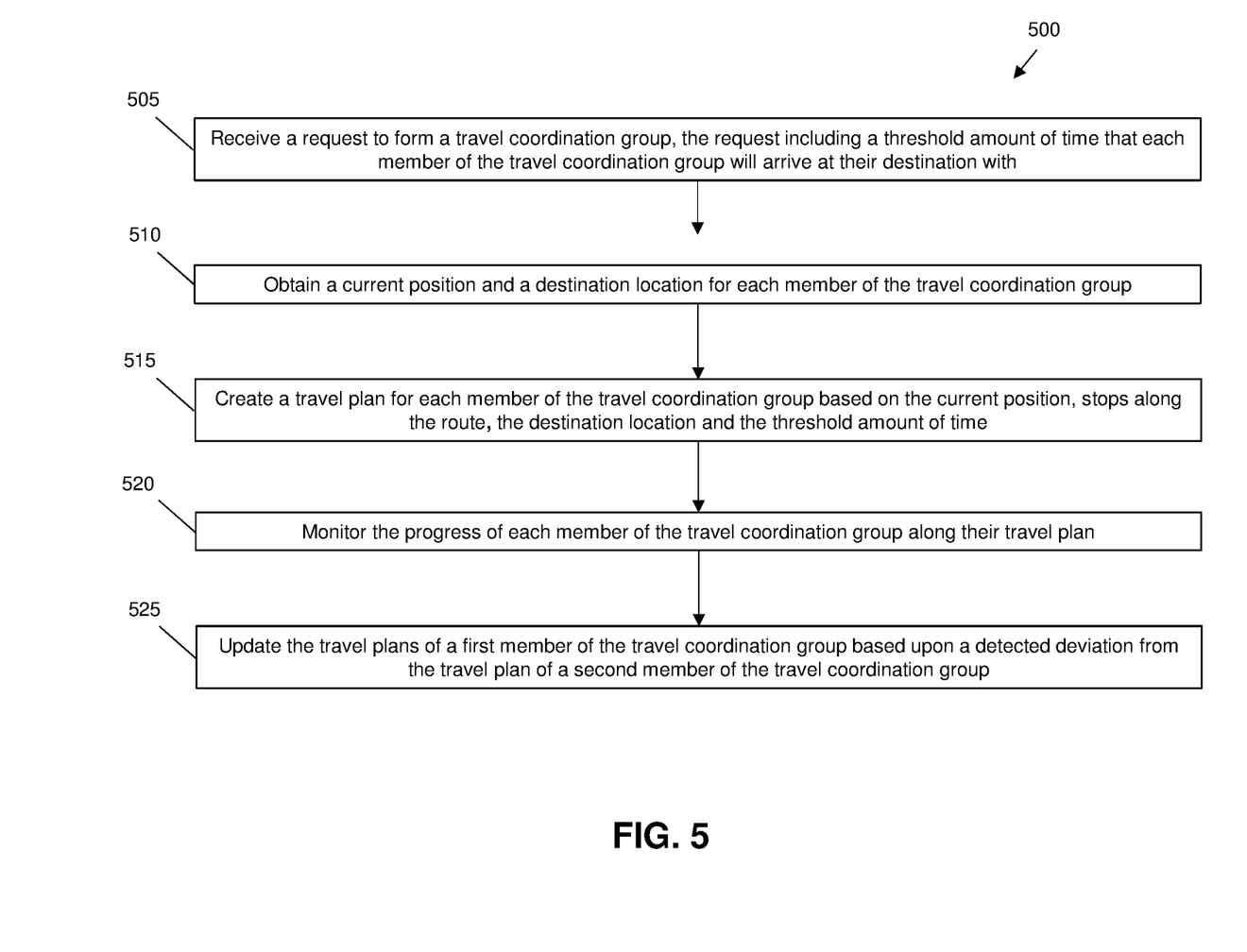
FIG. 5 depicts a flowchart of another method for time-based multiple automobile travel coordination according to an embodiment of the invention.

Referring now to FIG. 5 a flowchart of a method 500 for time-based multiple automobile travel coordination in accordance with an embodiment is shown. As shown at block 505, the method 500 includes receiving a request to form a travel coordination group, the request includes a threshold amount of time that each member of the travel coordination group will arrive at their destination within. The threshold amount of time is used to limit the amount of time that any member of the group will have to wait for the remaining members of the group. In one embodiment, the threshold amount of time is the same for each member of the group. In another embodiment, different thresholds are specified for each member of the group. For example, if a sales person has set a meeting with a potential client, the sales person may prefer to set the threshold time for the client to be less than, and perhaps substantially less than, the threshold for the sales person.

Continuing with reference to FIG. 5, the method 500 also includes obtaining a current position and a destination location for each member of the travel coordination group, as shown at block 510. In exemplary embodiments, the current position of each participant is obtained from an electronic device associated with the participant, such as a smartphone, automobile, or other device. In one embodiment, the current address, or starting address, of a participant is input manually by the participant. Next, as shown at block 515, the method 500 includes creating a travel plan for each member of the travel coordination group based on the current position, the destination location and the threshold amount of time. The travel plan includes an estimated time of departure, a travel route and may include one or more stops along the travel route. As discussed above, the stops along the route can be associated with a service provider, such as a restaurant, shop or gas station.

In exemplary embodiments, when a participant joins a travel coordination group that includes a destination and an initial desired meeting time, the participant inputs one or more service providers that the participant plans to visit during their travel to the destination. The specified service providers can include specific stops, such as a specific restaurant, or can include a general category of stop, such as a gas station. In exemplary embodiments, the travel coordination system is configured to generate a travel plan that includes stops at the specified service providers and that will result in the participant arriving at the destination during the desired time window. Once the travel plan is determined, a departure time and travel route is provided to the participant.

Next, as shown at block 520, the method 500 includes monitoring the progress of each member of the travel coordination group along their travel plan. In exemplary embodiments, monitoring the progress includes monitoring the current position of the participant and can also include monitoring traffic conditions along the planned travel route of the participant. The method 500 also includes updating the travel plans of a first member of the travel coordination group based upon a detected deviation, such as an observed delay or a departure from a planned route, from the travel plan of a second member of the travel coordination group, as shown at block 525. In exemplary embodiments, updating the travel plans of the first participant includes one or more of adding and removing a planned stop from the travel plans of the first participant.

In exemplary embodiments, when the travel coordination system determines that due to a delay or deviation that all of the members of the group will not arrive at the destination location within the desired time window; the travel coordination system can take various remedial actions. One such remedial action is to select a new time window that all participants can meet and update the travel plans of the participants as needed. Another remedial action is to cancel the planned meeting and setup a new travel plan. Yet another remedial action is to notify each of the affected members of the group that their expected waiting time for other members of the group has been increased.

In exemplary embodiments, a cloud computing system such as the one shown in FIGS. 1-2 is used to perform the methods 400 and 500 shown in FIGS. 4 and 5. In other embodiments, a computer system 300 such as the one shown in FIG. 3 is used to perform the methods 400 and 500 shown in FIGS. 4 and 5.

In exemplary embodiments, a travel coordination system utilizes shared navigation information to coordinates mobile travel for multiple participants who want to arrive at the same destination or corresponding destinations with a requested degree of closeness in the arrival times. The degree of closeness being a time duration (specified, e.g. in minutes) that is expected to contain all arrival times. In exemplary embodiments, the travel coordination system is configured to share the navigation information with service providers along selected routes, thereby providing the service provides with the expected times of arrival of the customer and allowing the customer to receive an estimated service/wait times from the service provider. In exemplary embodiments, as the travel schedule for each participant is altered (by changes in traffic or weather, or by change in an agreement to receive a service) the system makes recommendations to other participants for ways to adjust schedules to maintain the original requested degree of closeness, to change the requested degree of closeness, or to drop a participant from the group. As used herein the term automobile is used to refer to any vehicle travelling on ground, water, or air. In addition, the term participant is used to refer both human and non-human artificially intelligent individuals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for time-based multiple automobile travel coordination, the method comprising:
   creating a travel coordination group having at least two participants;
   obtaining a current position and a destination location for each of the at least two participants, wherein the current positions are obtained from electronic devices associated with the at least two participants;
   determining an estimated travel time for each of the at least two participants based at least in part on the current position and the destination location for each of the at least two participants; and
   coordinating travel plans for each of the at least two participants based at least in part on the estimated travel time of each of the at least two participants, wherein the coordination includes determining a departure time for each of the at least two participants such that each of the at least two participants will arrive at the destination location within a threshold amount of time from one another,
   wherein the threshold amount of time is received from one of the at least two participants and the coordinated travel plans are transmitted to the at least two participants, the threshold amount of time is a maximum amount of time that a first arriving participant of the at least two participants must wait for the second arriving participant of the at least two participants to arrive, and wherein the threshold amount of time is different for each of the at least two participants, and wherein coordinating travel plans for each of the at least two participants further includes estimating a time spent at a stop for one of the at least two participants including an estimated waiting time and an estimated service time for the stop, and wherein the stop is associated with a service provider and wherein the estimated waiting time and an estimated service time are obtained based at least in part on data received from the service provider.

2. The computer-implemented method of claim 1, wherein the destination location of each of the at least two participants is a same location.

3. The computer-implemented method of claim 1, wherein the estimated travel time for each of the at least two participants is further based on a traffic condition on a route between the current position and the destination location.

4. The computer-implemented method of claim 1, wherein the estimated travel time for each of the at least two participants is further based on a weather condition along a route between the current position and the destination location.

5. The computer-implemented method of claim 1, further comprising monitoring the current position of each of the at least two participants and updating the travel plans of a first participant based on an observed delay of the second participant.

6. The computer-implemented method of claim 5, wherein updating the travel plans of the first participant includes one or more of adding and removing a planned stop from the travel plans of the first participant.

7. A computer program product for time-based multiple automobile travel coordination, the computer program product comprising:
   a computer readable storage medium readable by a processing circuit and storing program instructions for execution by the processing circuit for performing a method comprising:
   creating a travel coordination group having at least two participants;
   obtaining a current position and a destination location for each of the at least two participants, wherein the current positions are obtained from electronic devices associated with the at least two participants;
   determining an estimated travel time for each of the at least two participants based at least in part on the current position and the destination location for each of the at least two participants; and
   coordinating travel plans for each of the at least two participants based at least in part on the estimated travel time of each of the at least two participants, wherein the coordination includes determining a departure time for each of the at least two participants such that each of the at least two participants will arrive at the destination location within a threshold amount of time from one another,
   wherein the threshold amount of time is received from one of the at least two participants and the coordinated travel plans are transmitted to the at least two participants, the threshold amount of time is a maximum amount of time that a first arriving participant of the at least two participants must wait for the second arriving participant of the at least two participants to arrive, and wherein the threshold amount of time is different for each of the at least two participants, and wherein coordinating travel plans for each of the at least two participants further includes estimating a time spent at a stop for one of the at least two participants including an estimated waiting time and an estimated service time for the stop, and wherein the stop is associated with a service provider and wherein the estimated waiting time and an estimated service time are obtained based at least in part on data received from the service provider.

8. The computer program product of claim 7, wherein the destination location of each of the at least two participants is a same location.

9. The computer program product of claim 7, wherein the estimated travel time for each of the at least two participants is further based on a traffic condition on a route between the current position and the destination location.

10. The computer program product of claim 7, wherein the estimated travel time for each of the at least two participants is further based on a weather condition along a route between the current position and the destination location.

11. The computer program product of claim 7, wherein the method further comprises monitoring the current position of each of the at least two participants and updating the travel plans of a first participant based on an observed delay of the second participant.

12. The computer program product of claim 11, wherein updating the travel plans of the first participant includes one or more of adding and removing a planned stop from the travel plans of the first participant.

13. A processing system for time-based multiple automobile travel coordination, the processor system comprising:
   a processor in communication with one or more types of memory, the processor configured to:
   create a travel coordination group having at least two participants;
   obtain a current position and a destination location for each of the at least two participants, wherein the current positions are obtained from electronic devices associated with the at least two participants;
   determine an estimated travel time for each of the at least two participants based at least in part on the current position and the destination location for each of the at least two participants; and
   coordinate travel plans for each of the at least two participants based at least in part on the estimated travel time of each of the at least two participants, wherein the coordination includes determining a departure time for each of the at least two participants such that each of the at least two participants will arrive at the destination location within a threshold amount of time from one another,
   wherein the threshold amount of time is received from one of the at least two participants and the coordinated travel plans are transmitted to the at least two participants, the threshold amount of time is a maximum amount of time that a first arriving participant of the at least two participants must wait for the second arriving participant of the at least two participants to arrive, and wherein the threshold amount of time different for each of the at least two participants, and
   wherein coordinating travel plans for each of the at least two participants further includes estimating a time spent at a stop for one of the at least two participants including an estimated waiting time and an estimated service time for the stop, and wherein the stop is associated with a service provider and wherein the estimated waiting time and an estimated service time are obtained based at least in part on data received from the service provider.

\* \* \* \* \*